United States Patent
Gaul (10) Patent No.: US 9,669,495 B2
(45) Date of Patent: Jun. 6, 2017

(54) APPARATUS FOR REFURBISHING A GAS TURBINE NOZZLE

(71) Applicant: Gregory R. Gaul, The Woodlands, TX (US)

(72) Inventor: Gregory R. Gaul, The Woodlands, TX (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 14/537,229

(22) Filed: Nov. 10, 2014

(65) Prior Publication Data

US 2015/0060438 A1    Mar. 5, 2015

Related U.S. Application Data (62) Division of application No. 12/192,685, filed on Aug. 15, 2008, now Pat. No. 8,887,390.

(51) Int. Cl.
| | | |
|---|---|---|
| *B23P 6/00* | (2006.01) | |
| *B21D 3/00* | (2006.01) | |
| *B21D 3/16* | (2006.01) | |

(52) U.S. Cl.
CPC .............. *B23P 6/002* (2013.01); *B21D 3/00* (2013.01); *B21D 3/16* (2013.01); *Y10T 29/37* (2015.01); *Y10T 29/49318* (2015.01)

(58) Field of Classification Search
CPC .. B23P 6/002; B21D 3/16; B21D 3/00; Y10T 29/49318; Y10T 29/37
See application file for complete search history.

(56) References Cited

U.S. PATENT DOCUMENTS

| | | |
|---|---|---|
| 3,021,673 A | 2/1962 | Mock |
| 3,300,180 A | 1/1967 | Tuttle et al. |
| 3,693,347 A | 9/1972 | Kydd et al. |
| 3,728,859 A | 4/1973 | Seiler |
| 3,826,080 A | 7/1974 | De Corso et al. |
| 3,859,787 A | 1/1975 | Anderson et al. |
| 3,937,007 A | 2/1976 | Kappler |
| 3,985,465 A | 10/1976 | Sheldon et al. |
| 4,012,904 A | 3/1977 | Nogle |
| 4,041,699 A | 8/1977 | Schelp |
| 4,067,190 A | 1/1978 | Hamm et al. |
| 4,160,362 A | 7/1979 | Martens et al. |

(Continued)

FOREIGN PATENT DOCUMENTS

JP       60173323 A    9/1985

OTHER PUBLICATIONS

PCT/US2008/085640—Notification Concerning Transmittal of International Preliminary Report on Patentability (Chapter I of the Patent Cooperation Treaty), International Preliminary Report on Patentability, Written Opinion of the International Searching Authority, dated Jun. 17, 2010, 9 pages.

(Continued)

*Primary Examiner* — Moshe Wilensky (57) ABSTRACT

A gas turbine nozzle can be refurbished to reduce downstream deflection. The outer shroud of the gas turbine nozzle is held in a fixture, and then the nozzle is heated. The heated nozzle is then reshaped by a force exerted upon the inner shroud of the gas turbine, reducing the downstream deflection of the nozzle. After the deformation of the nozzle, an aft hook of the nozzle that has been adjusted by previous refurbishment efforts can be rebuilt to remove the previous adjustments.

8 Claims, 11 Drawing Sheets

(56) References Cited

U.S. PATENT DOCUMENTS

| | | | |
|---|---|---|---|
| 4,195,476 | A | 4/1980 | Wood |
| 4,257,235 | A | 3/1981 | Morishita et al. |
| 4,259,837 | A | 4/1981 | Russell et al. |
| 4,667,465 | A | 5/1987 | Munk |
| 4,733,527 | A | 3/1988 | Kidd |
| 4,832,252 | A | 5/1989 | Fraser |
| 4,835,962 | A | 6/1989 | Rutter |
| 4,876,849 | A | 10/1989 | Klingels |
| 4,889,470 | A | 12/1989 | Scalzo |
| 4,924,581 | A | 5/1990 | Jakobsen |
| 4,928,478 | A | 5/1990 | Maslak |
| 5,060,842 | A | 10/1991 | Qureshi et al. |
| 5,062,205 | A | 11/1991 | Fraser |
| 5,081,843 | A | 1/1992 | Ishibashi et al. |
| 5,086,979 | A | 2/1992 | Koblish et al. |
| 5,117,636 | A | 6/1992 | Bechtel, II et al. |
| 5,199,265 | A | 4/1993 | Borkowicz |
| 5,235,814 | A | 8/1993 | Leonard |
| 5,251,447 | A | 10/1993 | Joshi et al. |
| 5,259,727 | A | 11/1993 | Quinn |
| 5,269,057 | A | 12/1993 | Mendham |
| 5,456,578 | A | 10/1995 | Honda et al. |
| 5,477,671 | A | 12/1995 | Mowill |
| 5,697,151 | A | 12/1997 | Werner et al. |
| 6,332,272 | B1 | 12/2001 | Sinnott et al. |
| 6,394,750 | B1 | 5/2002 | Hiskes |
| 6,502,303 | B2 | 1/2003 | Updegrove et al. |
| 6,568,077 | B1 | 5/2003 | Hellemann et al. |
| 6,892,931 | B2 | 5/2005 | Steplewski et al. |
| 7,008,170 | B2 | 3/2006 | Proveaux et al. |
| 7,036,318 | B1 | 5/2006 | Munson, Jr. |
| 7,146,990 | B1 | 12/2006 | Ngo et al. |
| 7,179,052 | B2 | 2/2007 | Sasaki et al. |
| 7,484,928 | B2 | 2/2009 | Arness et al. |
| 7,556,475 | B2 | 7/2009 | Roberts, III et al. |
| 7,722,314 | B2 | 5/2010 | Burdgick |
| 7,762,783 | B2 | 7/2010 | Cairo et al. |
| 8,186,056 | B2 | 5/2012 | Willis et al. |
| 8,771,786 | B2 | 7/2014 | Raiche et al. |
| 9,068,459 | B2 | 6/2015 | Sassatelli et al. |
| 9,085,053 | B2 | 7/2015 | Tholen et al. |
| 9,138,793 | B2 | 9/2015 | Nguyen-Dinh et al. |
| 2003/0005698 | A1 | 1/2003 | Keller |
| 2003/0082053 | A1 | 5/2003 | Jackson et al. |
| 2005/0172485 | A1 | 8/2005 | Mussen |
| 2007/0267109 | A1 | 11/2007 | Kelly et al. |
| 2007/0280820 | A1 | 12/2007 | Roberts et al. |
| 2008/0289179 | A1 | 11/2008 | Pellet et al. |
| 2009/0000102 | A1 | 1/2009 | Willis et al. |
| 2009/0229101 | A1 | 9/2009 | Ahmad et al. |
| 2009/0255114 | A1 | 10/2009 | Kernozicky et al. |
| 2009/0313822 | A1 | 12/2009 | Lee et al. |

OTHER PUBLICATIONS

PCT/US2008/085640—Notification of Transmittal of the International Search Report and the Written Opinion of the International Searching Authority, or the Declaration, International Search Report, Written Opinion of the International Searching Authority, dated Feb. 12, 2009, 10 pages.

PCT/US2010/034425—Notification of Transmittal of International Preliminary Report on Patentability (Chapter II of the Patent Cooperation Treaty), International Preliminary Report on Patentability, dated Jun. 1, 2011, 6 pages.

PCT/US2010/034425—Notification of Transmittal of the International Search Report and the Written Opinion of the International Searching Authority, or the Declaration, International Search Report, Written Opinion of the International Searching Authority, dated Jul. 15, 2010, 9 pages.

Brandt et al, "GE Gas Turbine Design Philosophy (GER-3434D)", General Electric Company, Sep. 1994, Schenectady, NY, 26 pages.

Cocca et al, "Performance and Reliability Improvements for MS5002 Gas Turbines (GER-4171)", General Electric Company, Date Unknown, Schenectady, NY, 26 pages.

Gill, Jennifer E., "Uprate Options for the MS9001 Heavy-Duty Gas Turbine (GER-3928B)", General Electric Company, Date Unknown, Schenectady, NY, 25 pages.

Ginter et al, "Uprate Options for the MS7001 Heavy Duty Gas Turbine (GER-3808C)", General Electric Company, Dec. 2006, Atlanta, GA, 68 pages.

Johnston, J.R., "Performance and Reliability Improvements for Heavy-Duty Gas Turbines (GER-3571H)", General Electric Company, Oct. 2000, Schenectady, NY, 50 pages.

Pallos, K.J., "Gas Turbine Repair Technology (GER-3957B)", General Electric Company, Apr. 2001, Atlanta, GA, 30 pages.

Schilke, P.W., "Advanced Gas Turbine Materials and Coatings (GER-3569G)", General Electric Company, Aug. 2004, Schenectady, NY, 30 pages.

Scoretz et al., "Industrial Steam Turbine Value Packages (GER-4191A)", General Electric Company, Dec. 2005, Atlanta, GA, 32 pages.

APPARATUS FOR REFURBISHING A GAS TURBINE NOZZLE

CROSS-REFERENCE TO RELATED APPLICATIONS

This application is a divisional of U.S. patent application Ser. No. 12/192,685, which was filed on Aug. 15, 2008. The aforementioned patent application is incorporated herein by reference to the extent consistent with the present disclosure.

TECHNICAL FIELD

The present invention relates to the field of gas turbines, and in particular to a technique for refurbishing gas turbine nozzles.

BACKGROUND ART

In a gas turbine, gas is typically produced by the combustion of fuel. The gas is then passed over a collection of stationary nozzles, which discharge jets of gas against the blades of a turbine rotor, forcing the rotor to rotate. The rotation of the rotor drives the external load of the turbine, such as an electrical generator.

One problem with gas turbines is that the gas loading on the nozzles and the high temperatures in the turbine, eventually cause the stationary turbine nozzles to deform. This is a particular problem with turbines where the nozzles are made of cobalt-based superalloys and use a cantilevered design.

SUMMARY OF INVENTION

In one embodiment, a method of refurbishing a gas turbine nozzle comprises mounting the gas turbine nozzle in a fixture, heating the gas turbine nozzle to a predetermined temperature range, and applying force to the heated gas turbine nozzle distal from the fixture sufficient to reshape the gas turbine nozzle by a calculated amount.

In another embodiment, an apparatus for refurbishing a gas turbine nozzle comprises a mounting fixture, configured to hold an outer shroud of the nozzle, a hydraulic jack, positioned below an inner shroud of the nozzle, adapted to exert an upward force on the inner shroud, a heat source, disposed with the nozzle, and a plurality of thermocouples, positioned with the nozzle and adapted for monitoring the temperature of the nozzle.

In another embodiment, an apparatus for refurbishing a gas turbine nozzle, comprises a means for holding a first portion of the nozzle, a means for heating the nozzle, a means for exerting an upward force on a second portion of the nozzle, distal from the first portion of the nozzle, and a means for supporting the second portion of the nozzle.

Other systems, methods, features, and advantages consistent with the present invention will become apparent to one with skill in the art upon examination of the following figures and detailed description. It is intended that such additional systems, methods, features, and advantages be included within this description and be within the scope of the invention.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

Figure 1:
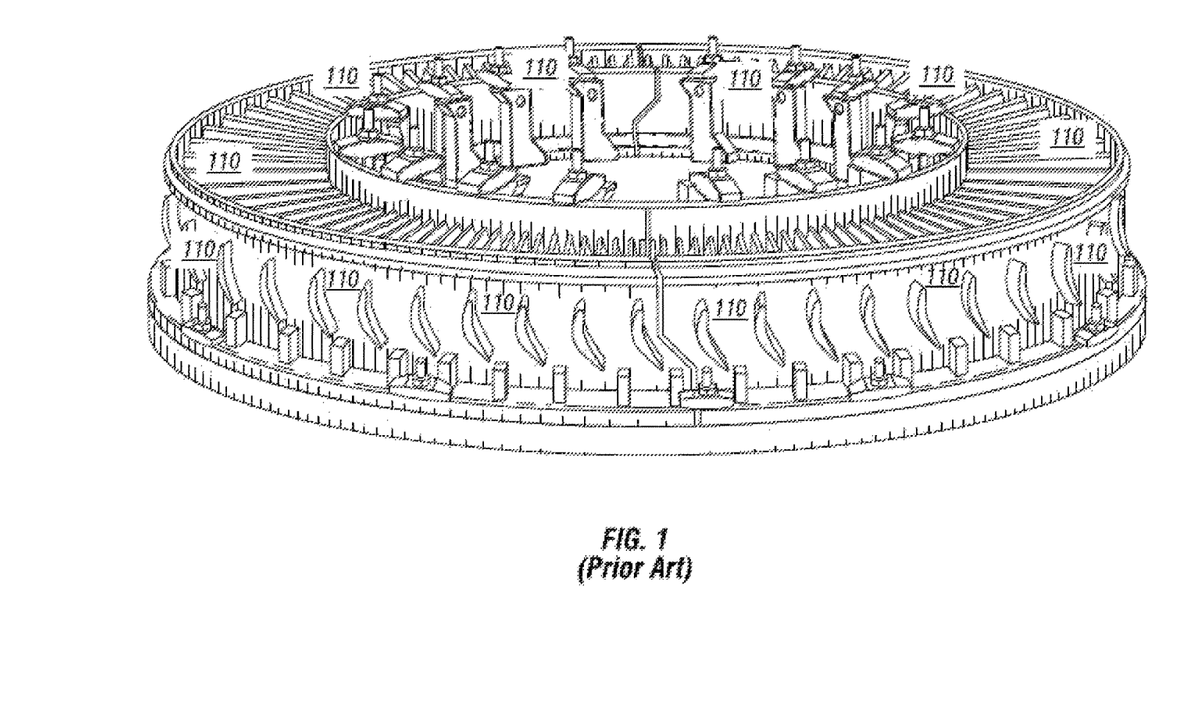
FIG. 1 is a drawing of an exemplary collection of stationary nozzles for a gas turbine, removed from the turbine for repair and refurbishment.

In a cantilevered gas turbine design, a ring 100, as illustrated in a radial view in FIG. 1, is composed of a plurality of circumferentially spaced apart stationary nozzles 110, each of which includes vanes supported between radially inner and outer bands or shrouds. Each nozzle 110 is typically an arcuate segment with two or more vanes joined between the inner and outer shrouds, as shown in more detail in FIG. 2. Each vane is an airfoil, and the vanes are typically cast with the inner and outer shrouds to form the nozzle.

Each nozzle 110 is cantilevered from the outer shroud, using hook to hold the nozzle in place. As the stationary nozzles 110 deform in a downstream direction, commonly referred to as downstream deflection (DSD), the nozzle 110 provides reduced axial clearances and radial seal clearances are compromised. As a consequence of the compromised clearances caused by the DSD, sealing effectiveness is reduced, which can result in high wheel space temperatures.

Figure 2:
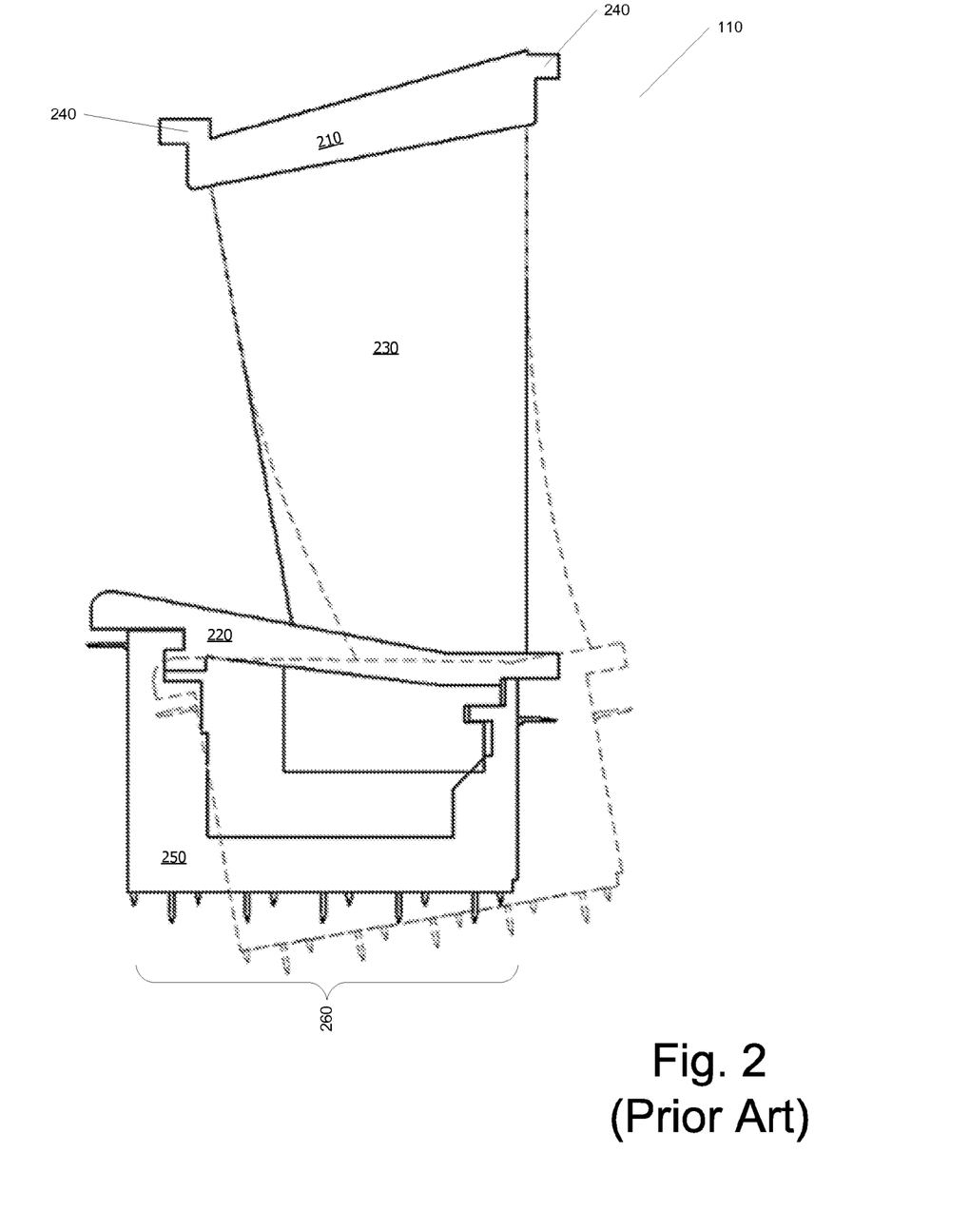
FIG. 2 is a radial view of a gas turbine nozzle illustrating the deformation caused by downstream deflection.

FIG. 2 is an illustration of a radial view of a typical nozzle 110 in both its original and an exemplary deformed condition caused by DSD. The nozzle 110 is exemplary and illustrative only and other nozzle configurations are known in the art. Similarly, the deformation is exemplary and illustrative only, and each nozzle 110 may have a deformation that is different from any other nozzle 110. As shown in FIG. 2, the original configuration of the nozzle 110 as manufactured is shown in solid lines, and a deformed configuration is shown in dashed lines, with the deformation exaggerated for clarity of the drawing. The nozzle 110 is fixed in place by the hooks 240 of the outer shroud 210 when mounted in the turbine, and the vanes 230 and inner shroud 220 are deflected downstream (to the right in FIG. 2). A box 250 engages with the inner shroud 220, and contains a plurality of packing teeth 260.

Figure 3:
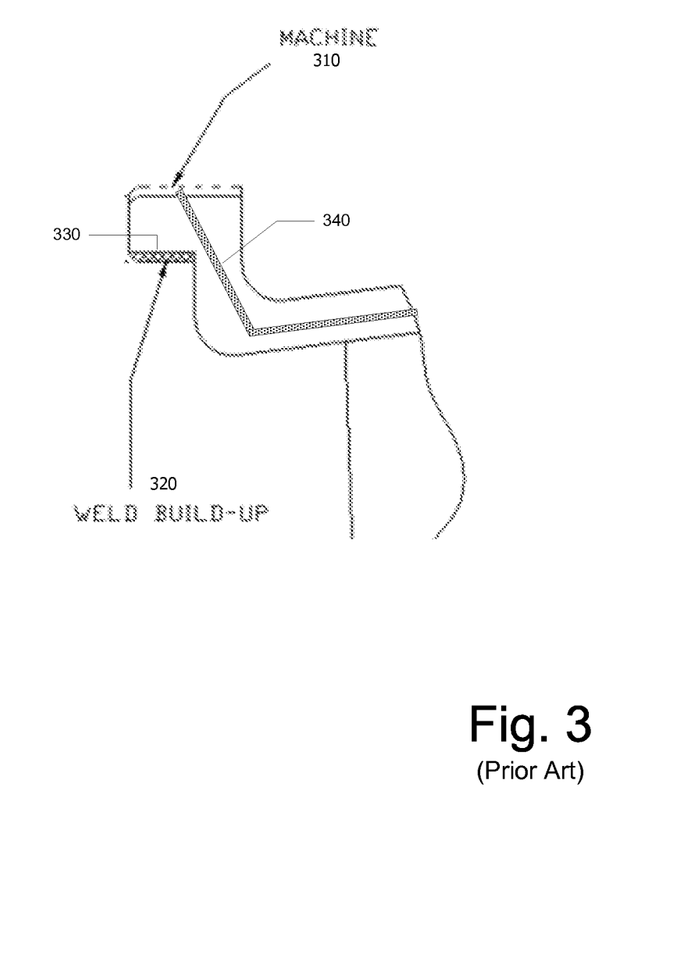
FIG. 3 is a side view of a hook of a gas turbine nozzle, illustrating a typical conventional adjustment to the hook.

Conventional refurbishment techniques attempt to rotate the nozzle 110 into the original position by adjusting one of the hooks 240. As illustrated in FIG. 3, a portion 310 of the hook 240 is machined away, and a pad 320 is built up by welding or brazing onto a radially inward surface 330 of the hook, causing the outer shroud 210 to rotate upwardly from its original position when installed back in the turbine, which brings the deformed nozzle 110 back to the position illustrated by dashed lines in FIG. 4, which shows the nozzle 110 (in solid lines) in its original state and the refurbished nozzle 110 (in dashed lines). As repeated DSD refurbishments are performed using this conventional technique, the repeated machining of the hooks 240 can also open segment seal slots 340, as shown in FIG. 3.

Figure 4:
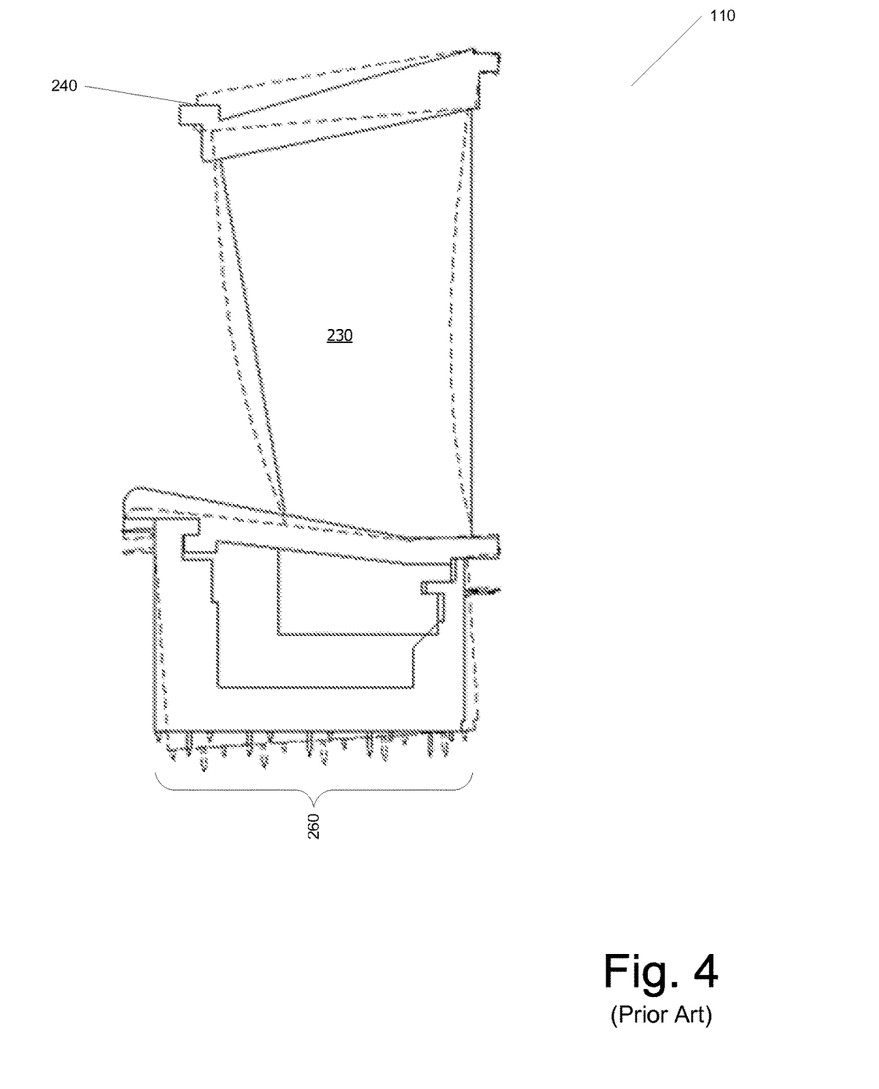
FIG. 4 is a radial view of a gas turbine nozzle illustrating the incomplete refurbishment of a conventional DSD refurbishment.

But as can be easily seen in FIG. 4, the conventional adjustment of the hook 240 does not actually change the geometry of the nozzle 110, but merely rotates the nozzle 110 to attempt to reduce the DSD. Furthermore, repeated conventional DSD refurbishment can change the outer sidewall flow path, and does not solve deformation problems such as the angled packing teeth 260, which can contribute to high wheel space temperatures.

Figure 5:
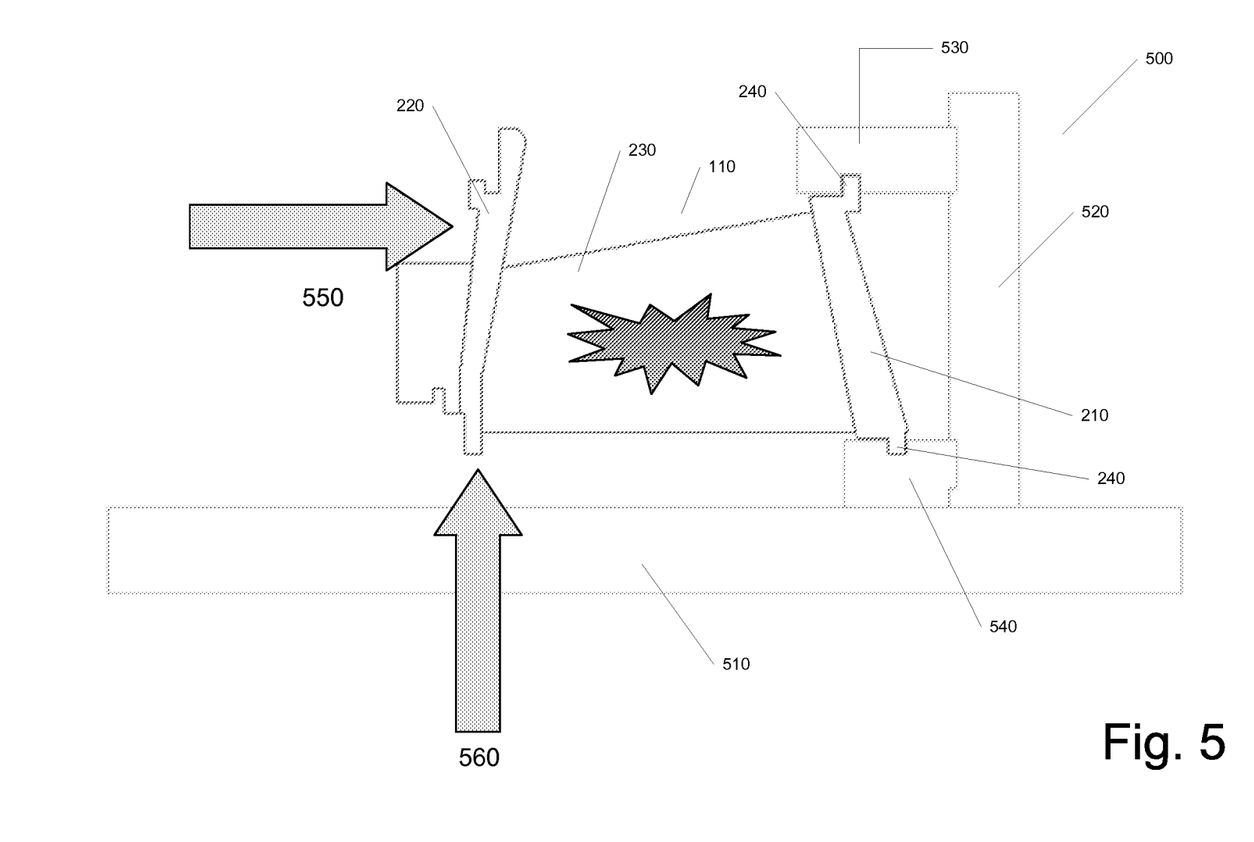
FIG. 5 is a side view illustrating a technique for reshaping a gas turbine nozzle according to various embodiments.

FIG. 5 is a line drawing in side view that illustrates one embodiment of a technique for refurbishing the gas turbine nozzle 110, even one that has been refurbished multiple times with conventional techniques. A work surface 510, typically a workbench or table, provides a place to mount fixture 500 to hold the nozzle 110 above the work surface 510 a sufficient working distance. The fixture 500 is composed of a plate 520, to which is attached brackets 530 and 540, configured to engage hooks 240. The box 250 (not shown) is typically removed from the nozzle 110 during the refurbishment. The fixture 500 is typically made of steel, although other suitably strong and heat-resistant materials can be used. The construction of the fixture 500 in FIG. 5 is exemplary and illustrative only and other configurations can be used. In particular, the fixture 500 can be of an integral construction or composed of additional elements than the elements shown in FIG. 5. The fixture 500 can be welded or otherwise suitably attached to the work surface 510 as desired.

Once the nozzle 110 is mounted on the fixture 500, the nozzle 110 is heated, then deformed in an upstream direction to counter the effect of downstream deflection, by force exerted from beneath the nozzle 110 upwardly, shown by arrow 560. In some embodiments, an additional force, shown by arrow 550, is exerted onto the inner shroud 220 toward the fixture 510.

By pushing upward on the heated nozzle 110, the deformation caused by DSD is actually reversed, bringing the nozzle 110 closer to its configuration when newly manufactured. Instead of merely rotating the deformed nozzle 110, the nozzle 110 is reshaped to reduce or eliminate the deformation, rotating the vanes 230 and inner shroud 220 relative to the hooks 240 and outer shroud 210. After the nozzle 110 is reshaped, if the nozzle 110 had previously been refurbished by the conventional hook adjustment technique, the modified hook 240 is rebuilt by removing the pad 320 that was added to the undersurface 330 of the hook 240, and welding back a pad onto an upper surface of the hook 240 where the previous refurbishment had machined off a portion 310 of the original hook 240. This rebuilding of the hook 240 can close segment seals 340 that may have been opened by the earlier refurbishments.

The order of steps of the above technique of first heating the nozzle 110, then reshaping it, and finally rebuilding the hook 240, can be rearranged, by first rebuilding the hook 240, then reshaping the nozzle 110 sufficiently on fixture 500 to rotate the vanes 230 and inner shroud 220 back into their original position relative to the hook 240. But the reordered technique is not as good as the preferred technique, because the hook 240 cannot be positioned as precisely. When the hook is rebuilt last, the desired position of the hook 240 can be calculated by an operator of the reshaping apparatus, then the nozzle 110 reshaped to approximately the right shape. After the heated nozzle 110 is reshaped, the hook 240 can be rebuilt to precisely the desired configuration, ensuring the nozzle 110, when put back into the gas turbine, is within or close to the manufacturer's specifications.

Superalloys such as the cobalt-based superalloys frequently used in the construction of the nozzles 110 are not generally considered pliable under heating, and are metallurgically created to attempt to avoid deformation at high temperatures. So one of skill in the art would have expected that heating the nozzle 110 would not allow for the controlled force reshaping necessary for refurbishment of the nozzle 110, but would have caused fractures or other metallurgical damage to the nozzle 110. Applicants have tested the nozzle 110 and found no such damage to the nozzle 110 after the reshaping treatment.

Figure 7:
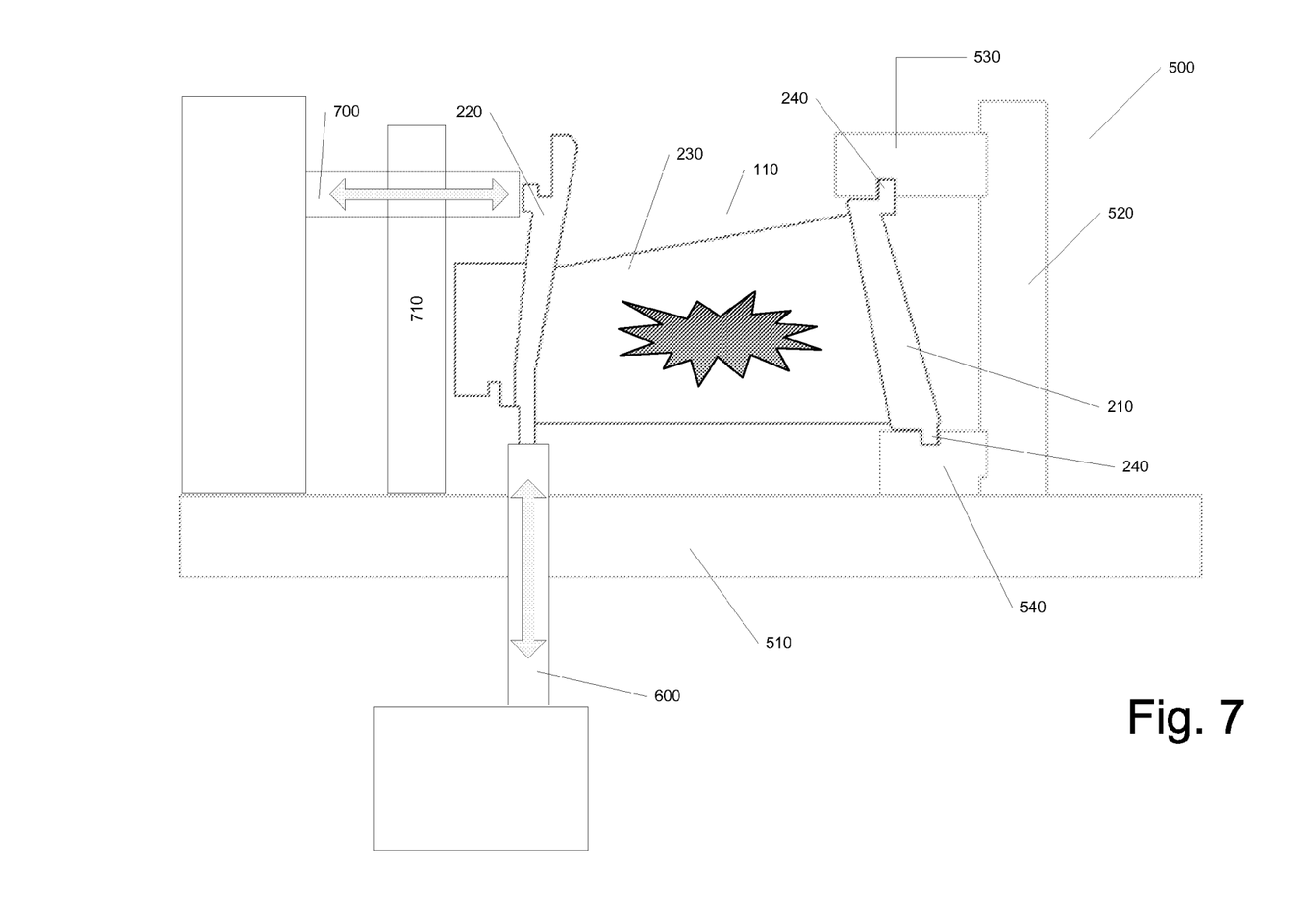
FIG. 7 is a side view illustrating an apparatus for reshaping a gas turbine nozzle according to another embodiment.

In an embodiment where both the force 560 and force 550 are used, the inner shroud 220 can be caused to rotate in an additional dimension. But in experimental testing, it was determined that use of the force 560 is typically sufficient, and that the rotation caused by the force 550 tends to occur without the force 550 as the nozzle 110 is pushed closer into its original configuration. In such an embodiment, illustrated in FIG. 7, a jack shaft 700 moves through a fixture 710, mounted to the work surface 510, under pressure from another hydraulic jack (not shown). Other techniques can be used to exert the force 550 on the inner shroud 220.

Figure 6:
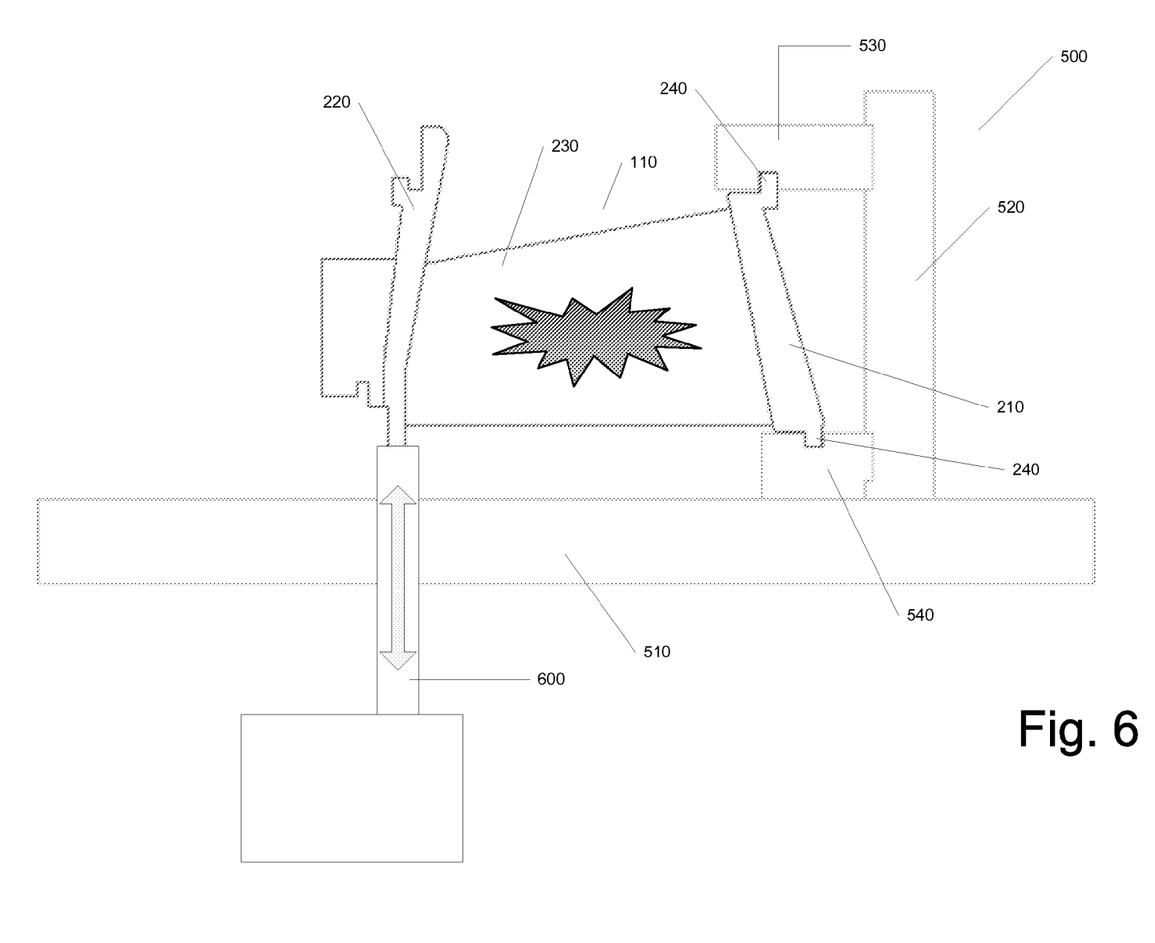
FIG. 6 is a side view illustrating an apparatus for reshaping a gas turbine nozzle according to one embodiment.

Force 560 is applied by pressure from a hydraulic jack, typically raising one or more jack shafts 600 through the work surface 510. Preferably, at least two jack shafts 600 are used, exerting force equally or differentially as desired on the inner shroud 220. With a differential jacking, a desired radial rotation of the inner shroud 220 and vanes 230 can be performed if needed. Once the nozzle 110 has been jacked up sufficiently, jack stands can be inserted to allow the inner shroud 210 to rest on the jack stands and withdrawal of the jack shafts 600 while allowing the reshaped nozzle 110 to cool, before completing the refurbishment by adjustment of the hook 240, as described above. Any convenient kind of jack stand can be used, for example, a screw-type jack stand, such as the jack stands 910 in FIG. 9 or a fixed height stand, such as a cylinder machined to a predetermined height appropriate for the nozzle 110. The jack stands can be affixed to the work surface 510, or movable as desired.

Figure 8:
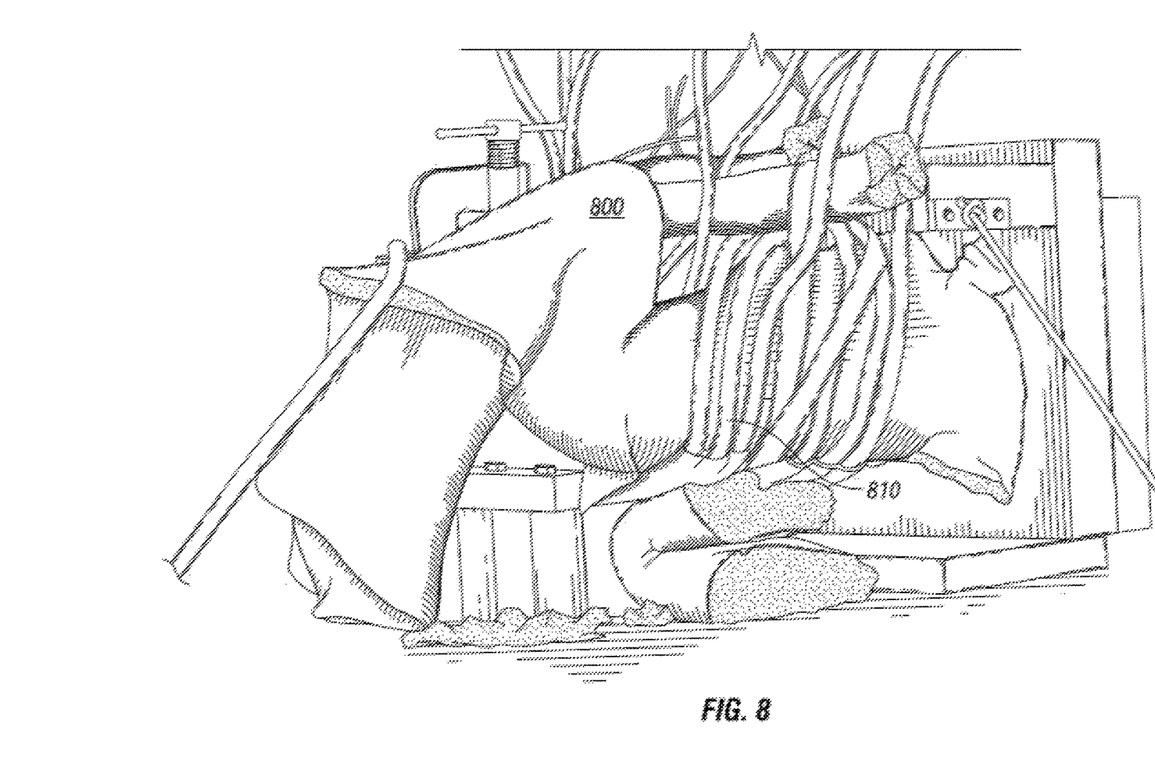
FIG. 8 is a side view illustrating the use of insulating blankets on the gas turbine nozzle according to one embodiment.

To heat the nozzle 110 prior to reshaping, the nozzle 110 is first insulated using insulating blankets 800, as shown in FIG. 8. This is in part for safety of the operator. Because the heating is done by induction heating, the insulating blankets 800 can be applied before wrapping the nozzle 110 with the induction heating wires, as shown in FIG. 8. The type and position of the insulating blankets 800 illustrated in FIG. 8 is exemplary and illustrative only, and any convenient insulating blankets and positioning thereof can be used.

Figure 9:
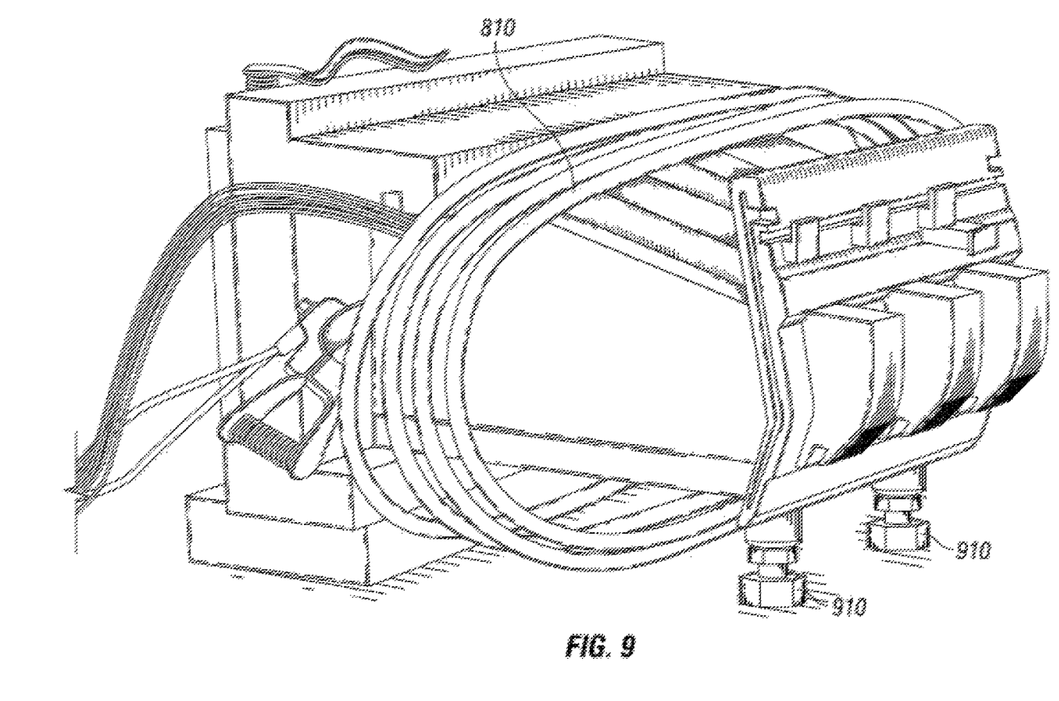
FIG. 9 is a side view illustrating one embodiment of induction heating coils for heating a gas turbine nozzle.

In one embodiment, the heating is achieved by using induction heating coils 810, which are typically composed of copper tubing, with a high temperature insulation mesh surrounding the tubing. The tubing has high frequency electricity provided to it, and cooling water on the inside, creating an electromagnetic effect that induces electrical currents within the part surrounded by the high frequency magnetic field. Because an even temperature is desirable for the reshaping of the nozzle 110, the induction heating coils are wrapped around the nozzle 110. Various configurations of the coils can be used, such as shown in FIGS. 8 and 9. In one embodiment, a configuration that is a pinched ovoid shape (roughly that of a peanut) is used, although other configurations can be used as convenient or desired. In some embodiments, such as shown in FIG. 9, the induction heating coils are wrapped around the nozzle 110 as a whole. In other embodiments, the induction heating coils can be wrapped through gaps between the vanes 230.

The use of induction heating is exemplary and illustrative only. Other heating techniques can be used, such as quartz lamps, resistance heating, flame heating, etc.

Figure 10:
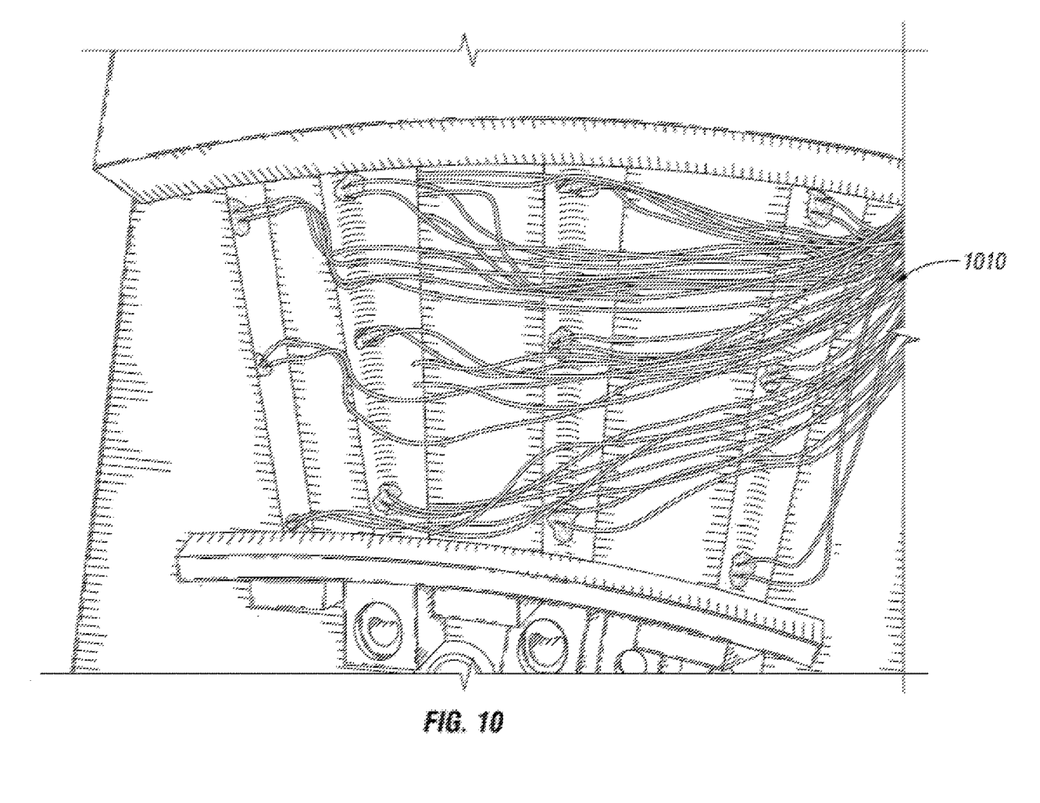
FIG. 10 is a top view illustrating a plurality of thermocouples used to monitor the heating of the gas turbine nozzle according to one embodiment.

Typically, a plurality of thermocouples 1010, as illustrated in FIG. 10, allow an operator to monitor the temperatures at various locations on the nozzle 110, to ensure no hot spots, and also to allow the operator to control the power in the induction coils 810, bringing up the power to the coils and the ramp rate to achieve the desired temperature of the nozzle 110. Any convenient thermocouple control and monitoring mechanism can be used.

The temperature used for this technique is dependent upon the materials used to construct the nozzle 110. For some nozzles 110, the superalloy metal is heated to approximately 2000° F., and generally between 1800° F. and 2100° F. The specific temperatures are exemplary and illustrative only, and different superalloy metals would require heating to a different range. For any nozzle 110, however, the nozzle 110 should be heated to a temperature above a hardening temperature, but below a melting point of the metal.

Figure 11:
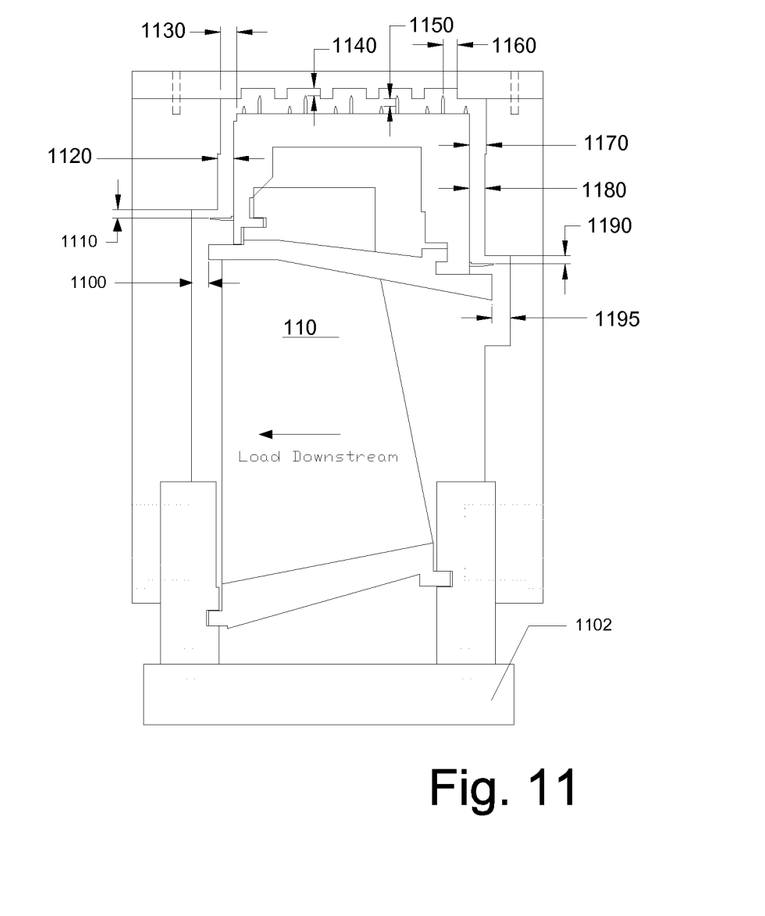
FIG. 11 is a side view illustrating a reshaped gas turbine nozzle mounted with a saddle fixture for inspection after reshaping according to one embodiment.

After refurbishment, the nozzle 110 can be checked for compliance with the manufacturer's specifications by placing the nozzle 110 into a testing saddle such as the exemplary and illustrative saddle fixture 1102 of FIG. 11, which mimics the surrounding components in the gas turbine. Then the positioning of the nozzle 110 can be checked at predetermined points, such as points 1100-1195. For example, dimension 1100 is one dimension that is directly affected by DSD. After reshaping, the nozzle 110 should be within manufacturer's tolerances.

While certain exemplary embodiments have been described in details and shown in the accompanying drawings, it is to be understood that such embodiments are merely illustrative of and not devised without departing from the basic scope thereof, which is determined by the claims that follow.

I claim:

1. An apparatus for refurbishing a gas turbine nozzle, comprising:
    a first mounting fixture affixed to a work surface and configured to hold an outer shroud of the gas turbine nozzle;
    a second mounting fixture affixed to the work surface;
    a first hydraulic jack positioned below an inner shroud of the gas turbine nozzle and adapted to exert a first force in a first linear direction on the inner shroud;
    a second hydraulic jack adapted to move through the second mounting fixture and contact the inner shroud to exert a second force in a second linear direction on the inner shroud;
    a heat source disposed with the gas turbine nozzle; and
    a plurality of thermocouples positioned with the gas turbine nozzle and adapted for monitoring the temperature of the gas turbine nozzle.

2. The apparatus of claim 1, wherein the heat source is an induction heating coil.

3. The apparatus of claim 2, wherein the induction heating coil forms a pinched ovoid.

4. The apparatus of claim 1, wherein the gas turbine nozzle has dimensions after refurbishment substantially similar to an original configuration.

5. An apparatus for refurbishing a gas turbine nozzle, comprising:
    a first mounting fixture affixed to a work surface and configured to hold an outer shroud of the gas turbine nozzle;
    a second mounting fixture affixed to the work surface;
    means for heating the gas turbine nozzle;
    a first hydraulic jack positioned below an inner shroud of the gas turbine nozzle and adapted to exert a first force in a first linear direction on the inner shroud; and
    a second hydraulic jack adapted to move through the second mounting fixture and contact the inner shroud to exert a second force in a second linear direction on the inner shroud.

6. The apparatus of claim 5, further comprising:
    means for insulating the gas turbine nozzle.

7. The apparatus of claim 5, wherein the gas turbine nozzle has dimensions after refurbishment substantially similar to an original configuration.

8. The apparatus of claim 5, wherein the means for heating the gas turbine nozzle comprises a means for induction heating the gas turbine nozzle.

* * * * *